US009989961B2

(12) United States Patent
Linderer et al.

(10) Patent No.: US 9,989,961 B2
(45) Date of Patent: Jun. 5, 2018

(54) ANTENNA POSITIONING SYSTEM

(71) Applicant: Winegard Company, Burlington, IA (US)

(72) Inventors: Timothy Jay Linderer, Payson, IL (US); Aaron Joseph Dunkin, West Burlington, IA (US)

(73) Assignee: Winegard Company, Burlington, IA (US)

( * ) Notice: Subject to any disclaimer, the term of this patent is extended or adjusted under 35 U.S.C. 154(b) by 399 days.

(21) Appl. No.: 14/945,674

(22) Filed: Nov. 19, 2015

(65) Prior Publication Data

US 2016/0161942 A1   Jun. 9, 2016

Related U.S. Application Data

(60) Provisional application No. 62/087,146, filed on Dec. 3, 2014.

(51) Int. Cl.
 *G05B 19/19* (2006.01)
 *G05B 24/02* (2006.01)

(52) U.S. Cl.
 CPC .................... *G05B 24/02* (2013.01)

(58) Field of Classification Search
 CPC .. G07C 5/008; G05D 1/0088; G01C 21/3697; G06F 19/3418; G07B 15/063
 See application file for complete search history.

(56) References Cited

U.S. PATENT DOCUMENTS

| 2,794,162 | A | | 5/1957 | Lifsey |
| 2,950,478 | A | | 8/1960 | Reppert |
| 2,989,680 | A | | 6/1961 | Weiser et al. |
| 3,229,176 | A | | 1/1966 | Curll et al. |
| 3,248,730 | A | | 4/1966 | Neumeyer |
| 3,534,230 | A | | 8/1970 | York |
| 3,671,969 | A | | 6/1972 | Basman |
| 3,797,014 | A | * | 3/1974 | Tompkins ............. G01S 7/2923 342/184 |
| 3,952,238 | A | | 4/1976 | Cutler |
| 4,303,872 | A | | 12/1981 | Alf et al. |
| 4,446,407 | A | | 5/1984 | Sperber |
| 4,514,670 | A | | 4/1985 | Fassel et al. |
| 4,542,326 | A | | 9/1985 | Hornback |
| 4,845,500 | A | * | 7/1989 | Cornett ................. G01S 7/2927 342/139 |

(Continued)

*Primary Examiner* — Shawki S Ismail
*Assistant Examiner* — Zoheb Imtiaz
(74) *Attorney, Agent, or Firm* — Dorr, Carson & Birney PC

(57) ABSTRACT

An antenna positioning system includes an outdoor unit with a rotating antenna driven by a motor, and an indoor unit connected to the outdoor unit via a communications link, such as a cable or a wireless link, that enables the indoor unit to control the outdoor unit. On startup, the processor of the indoor unit directs the antenna to search for available signals. The resulting signal information is stored and displayed on a user interface on the indoor unit. The user can then select a desired signal and the processor of the indoor unit will automatically rotate the antenna to the appropriate angular position. Both the search procedure and repositioning of the antenna rely on accurate calibration of the antenna's angular velocity to determine the antenna's angular position, rather than relying on a position sensor.

10 Claims, 8 Drawing Sheets

(56) References Cited

U.S. PATENT DOCUMENTS

| | | | | |
|---|---|---|---|---|
| 4,853,839 A | * | 8/1989 | Nichols | G01S 13/723 341/116 |
| 5,043,737 A | * | 8/1991 | Dell-Imagine | G01S 3/42 342/352 |
| 5,144,564 A | | 9/1992 | Naidu et al. | |
| 5,214,364 A | * | 5/1993 | Perdue | G05B 19/408 318/600 |
| 5,331,262 A | | 7/1994 | Francisco | |
| 5,585,804 A | | 12/1996 | Rodeffer | |
| 6,069,462 A | * | 5/2000 | Flynn | H01Q 3/04 318/466 |
| 6,229,500 B1 | * | 5/2001 | Caille | H01Q 3/14 343/753 |
| 6,535,178 B1 | | 3/2003 | Wang | |
| 6,668,172 B1 | * | 12/2003 | Yoshimura | H04B 7/0845 455/232.1 |
| 7,502,590 B2 | | 3/2009 | Suzu | |
| RE41,540 E | | 8/2010 | Tait | |
| 8,085,210 B2 | | 12/2011 | Dalin | |
| 8,264,408 B2 | * | 9/2012 | Kainulainen | G01S 3/023 342/417 |
| 8,466,965 B2 | | 6/2013 | Murphy et al. | |
| 2002/0083458 A1 | | 6/2002 | Henderson et al. | |
| 2003/0103149 A1 | * | 6/2003 | Kinjo | G06F 17/30265 348/231.5 |
| 2005/0280594 A1 | * | 12/2005 | Dennison | H01Q 3/02 343/766 |
| 2006/0208169 A1 | * | 9/2006 | Breed | B60N 2/002 250/221 |
| 2006/0253242 A1 | | 11/2006 | Prebola | |
| 2007/0067137 A1 | * | 3/2007 | Ohkubo | G01C 21/28 702/142 |
| 2007/0159405 A1 | * | 7/2007 | Eom | G01S 3/42 343/757 |
| 2010/0019986 A1 | * | 1/2010 | Dalin | H01Q 1/1257 343/882 |
| 2014/0320337 A1 | * | 10/2014 | Jihoon | G01S 1/12 342/351 |

* cited by examiner

ANTENNA POSITIONING SYSTEM

RELATED APPLICATION

The present application is based on and claims priority to the Applicant's U.S. Provisional Patent Application 62/087,146, entitled "Antenna Positioning System," filed on Dec. 3, 2014.

BACKGROUND OF THE INVENTION

Field of the Invention

The present invention relates generally to the field of antennas. More specifically, the present invention discloses an antenna positioning system that relies on accurate calibration of the rotational velocity of the antenna to determine its angular position.

Statement of the Problem

A wide variety of antennas have been invented in the past that rotate about at least one axis. Many antennas have patterns that are directional, and therefore benefit from positioning systems that can automatically point the antenna toward a desired transmitter/receiver, such as a satellite or a terrestrial signal source. Some antenna systems provide azimuth rotation (i.e., rotation about a vertical axis). Satellite antenna systems usually provide both azimuth and elevational rotation of the antenna. The following disclosure of the present invention is directed primarily to azimuth rotation of the antenna, as the simplest case. However, it should be understood that the present invention could be readily applied to antenna rotation about multiple axes.

Antenna positioning systems typically include a controller and a drive motor that rotates the antenna (e.g., directly via a mounting spindle, or indirectly via a ring gear or other gear or belt-drive mechanism). Obviously, the controller must know the precise angular position of the antenna to accurately control its angular position and obtain optimal antenna performance. This is commonly done by a position sensor that detects the angular position of the antenna and provides feedback to the controller. Several types of position sensors have been used in the past, but the costs and complexity associated with conventional position sensors have been ongoing concerns. Therefore, a need exists for an antenna positioning system that does not require a position sensor.

Solution to the Problem

The present invention eliminates the need for a position sensor by relying on accurate calibration of the angular velocity of the antenna to determine the angular position of the antenna. During initial startup, the present system measures the time required for the antenna to rotate between two known angular positions defined by a stop, which allows calculation of the antenna's angular velocity. During subsequent operation of the antenna system, the controller can accurately move the antenna from a known present angular position to a desired new angular position by determining the required travel time based on the angle between the two angular positions and the antenna's angular velocity.

The present antenna system can also include a search mode in which the antenna searches for available signals over a predetermined range of rotation, or incrementally searches within sectors. In either case, the direction of any detected signals can be determined by the controller based on travel time and the antenna's angular velocity. The signal information (e.g., signal direction and strength) gathered during the search is stored and used during subsequent operation of the antenna system.

Calculations of the antenna's angular position can be further refined by including temperature calibration, and to account to the acceleration and deceleration characteristics of the drive system, and the rotational inertia of the antenna and related components.

SUMMARY OF THE INVENTION

This invention provides an antenna positioning system that relies on accurate calibration of the angular velocity of the antenna to determine the angular position of the antenna, and thereby eliminates the need for a position sensor. The present system includes an outdoor unit with a rotating antenna driven by a motor, and an indoor unit connected to the outdoor unit via a communications link, such as a cable or a wireless link, that enables the indoor unit to control the outdoor unit. On startup, the processor of the indoor unit directs the antenna to search for available signals. The resulting signal information is stored and displayed on a user interface on the indoor unit. The user can then select a desired signal and the processor of the indoor unit will automatically rotate the antenna to the appropriate angular position. Both the search procedure and repositioning of the antenna rely on accurate calibration of the antenna's angular velocity to determine the antenna's angular position.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
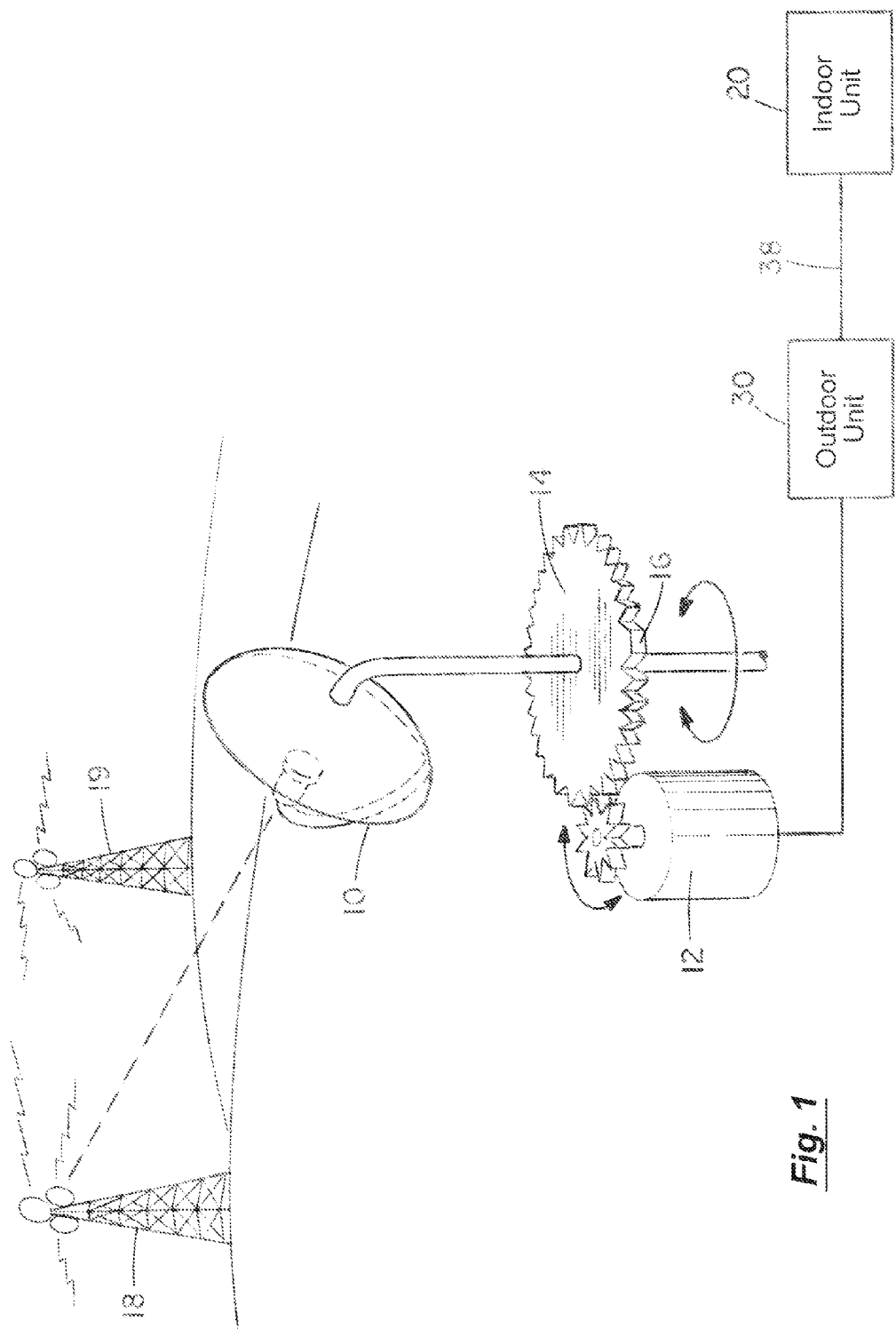
FIG. 1 is a schematic block diagram of an embodiment of the present invention.

Turning to FIG. 1, a schematic block diagram is provided showing an embodiment of the present invention. The major components of the present system include a rotatable antenna 10, an outdoor unit (ODU) 30, and an indoor unit (IDU) 20. A motor 12 is used to rotate the antenna 10 about an axis. For example, the motor 12 can directly drive the antenna 10, or the antenna 10 can be driven via a drive gear, belt or transmission mechanism. Any of a wide variety of antennas can be employed. In the embodiment shown in FIG. 1, the drive gear 14 includes a mechanical stop 16, or hard stop, that serves as a fixed point of reference regarding rotation of the antenna 10, as will be described in greater detail below. This stop 16 limits further rotation of the antenna beyond a predetermined point. Other types of stops could be readily substituted. This embodiment is limited to antenna rotation about a vertical axis, which is typically sufficient for over-the-air TV reception. It should be understood that the present invention could be extended to accommodate antenna rotation about multiple axes, as is more typically required for satellite antennas.

Figure 2:
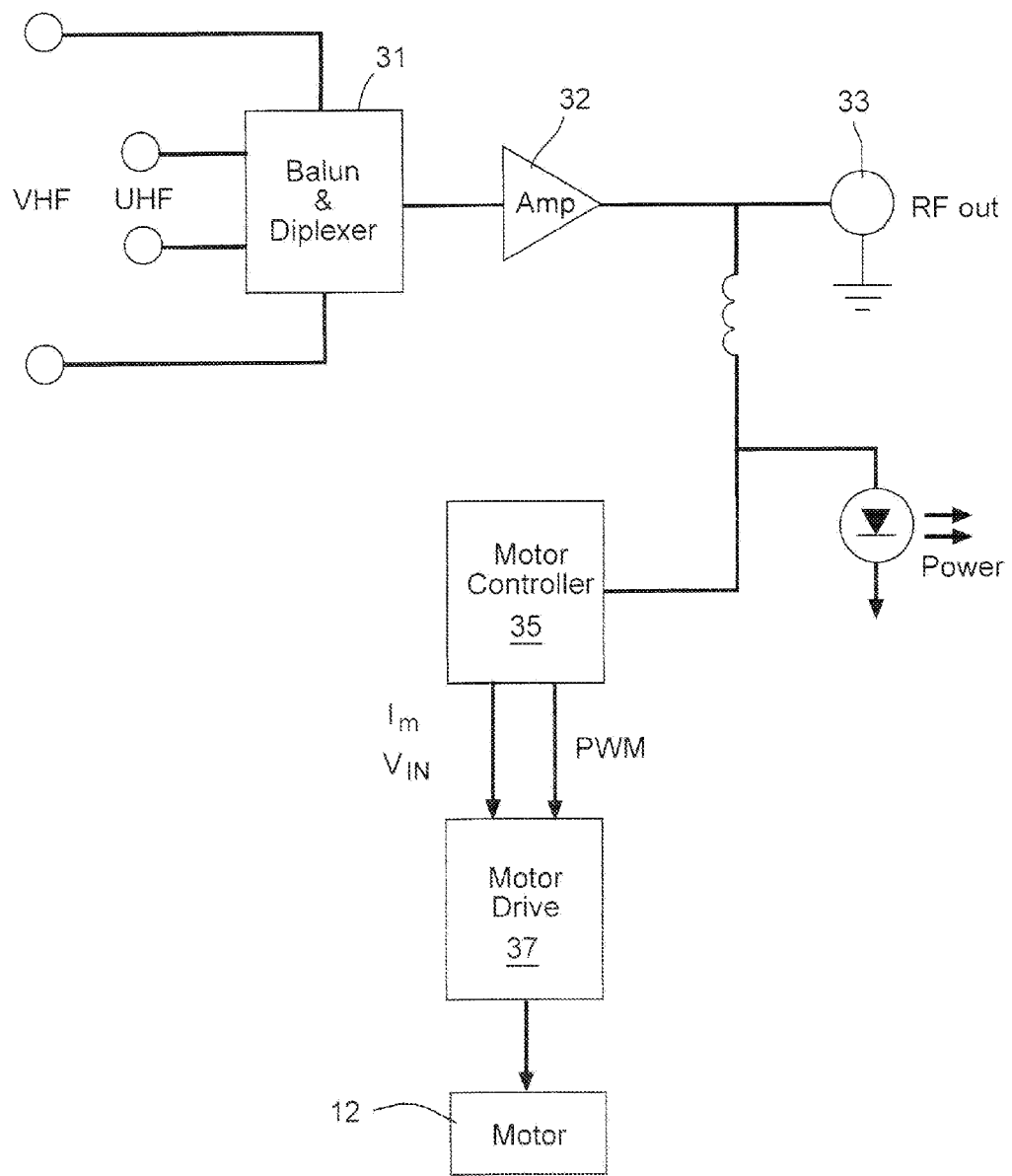
FIG. 2 is a block diagram of the outdoor unit (ODU) 30 of the present invention.

FIG. 2 is a block diagram of the outdoor unit (ODU) 30. The ODU 30 in this embodiment includes a conventional balun and diplexer 31, and amplifier 32 for processing the UHF and VHF signals from the antenna 10 that are output to the IDU 20 via a front connector 33 and cable 38. The ODU 30 also includes a motor controller 35 and motor drive circuitry 37 that control operation of the motor 12 to rotate the antenna 10. In the preferred embodiment of the present invention, the IDU 20 provides substantially all of the system intelligence, so these antenna drive functions are under the ultimate control of the IDU 20, as will be described below. The motor controller 35 detects DC control signals sent by the IDU 20 over the cable 38, and operates the motor 12 accordingly. For example, a DC signal of less than 6.5 volts can indicate a stop condition. A DC signal between 6.5V and 7.5V indicates clockwise antenna rotation, and a DC signal greater than 7.5V indicates counterclockwise antenna rotation. The motor drive circuitry 37 also monitors the input voltage ($V_{IN}$) and motor current ($I_M$) to enable the motor controller 35 to quickly shut down the motor 12 if either value exceed predetermined limits.

Using a single cable 28 to both transmit the antenna signal from the ODU 30 to the IDU 20, and transmit DC control signals from the IDU 20 to the ODU 30 simplifies wiring between these units 20, 30. However, it should be understood that other control protocols could be substituted. In addition, other types of wired or wireless communications links could be used between the IDU 20 and ODU 30.

Figure 3:
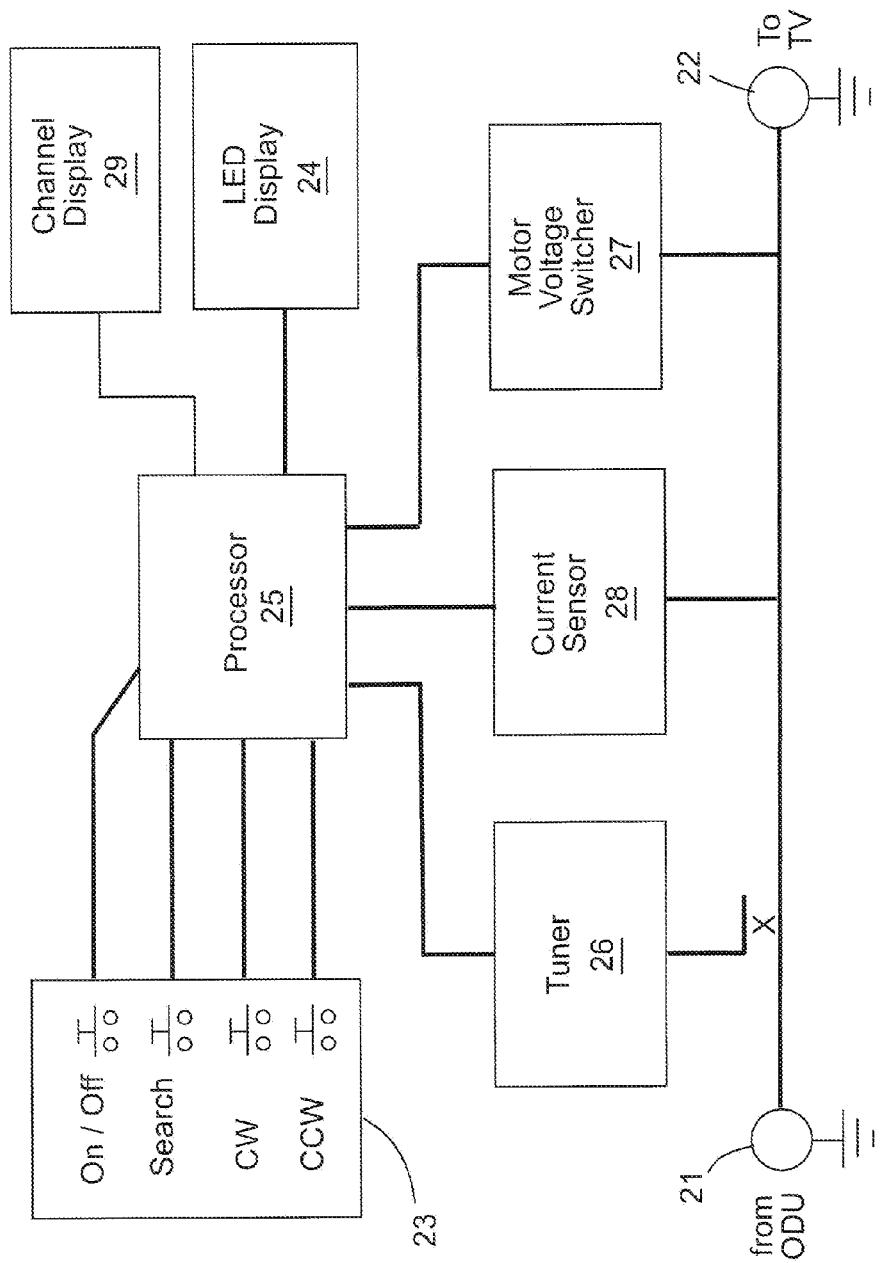
FIG. 3 is a block diagram of the indoor unit (IDU) 20 of the present invention.

FIG. 3 is a block diagram of the indoor unit (IDU) 20. This includes a processor 25 that effectively controls operation of the entire antenna system. In particular, the processor 25 controls operation of the ODU 30 and antenna 10, controls the user interface 23 and LED displays 24 of the IDU 20, and also stores data regarding the current antenna location and signal locations found during the search procedure. The IDU 20 also includes a user interface 23 with manual controls for operation of the system (e.g., moving the antenna and searching for available TV signals), and LED displays 24 indicating the system status for the user. In addition, the IDU 20 is equipped with a coaxial connector 21 for attaching the cable 38 to the ODU 30, and another coaxial connector 22 for attaching a coaxial cable to a TV. A tuner 26 is included to allow the processor to measure signal strength from the ODU 30 during the search procedure. Optionally, the tuner could also be used to identify TV channels. If so, a channel display 29 can be employed to display this TV channel information for the user.

A current sensor 28 enables the processor 25 to monitor the current drawn by the ODU 30 and motor 12 via the cable 38. A current drop indicates that the motor 12 has stopped, which is typically as a result to hitting the hard stop 16 shown in FIG. 1. This enables the processor 25 in the IDU 20 to know when the antenna 10 has moved to the known stop position. In addition, the processor 25 can then respond by directing the motor 12 to stop.

Finally, the IDU 20 includes DC power switching circuitry 27 controlled by the processor 25 that regulates the voltage ($V_{OUT}$) of the DC power supplied to the ODU 30 via the cable 38. As discussed above, this DC voltage serves as a control signal to the motor controller 35 in the ODU 30 to either stop the motor 12, rotate the antenna clockwise, or rotate the antenna counterclockwise.

Figure 4:
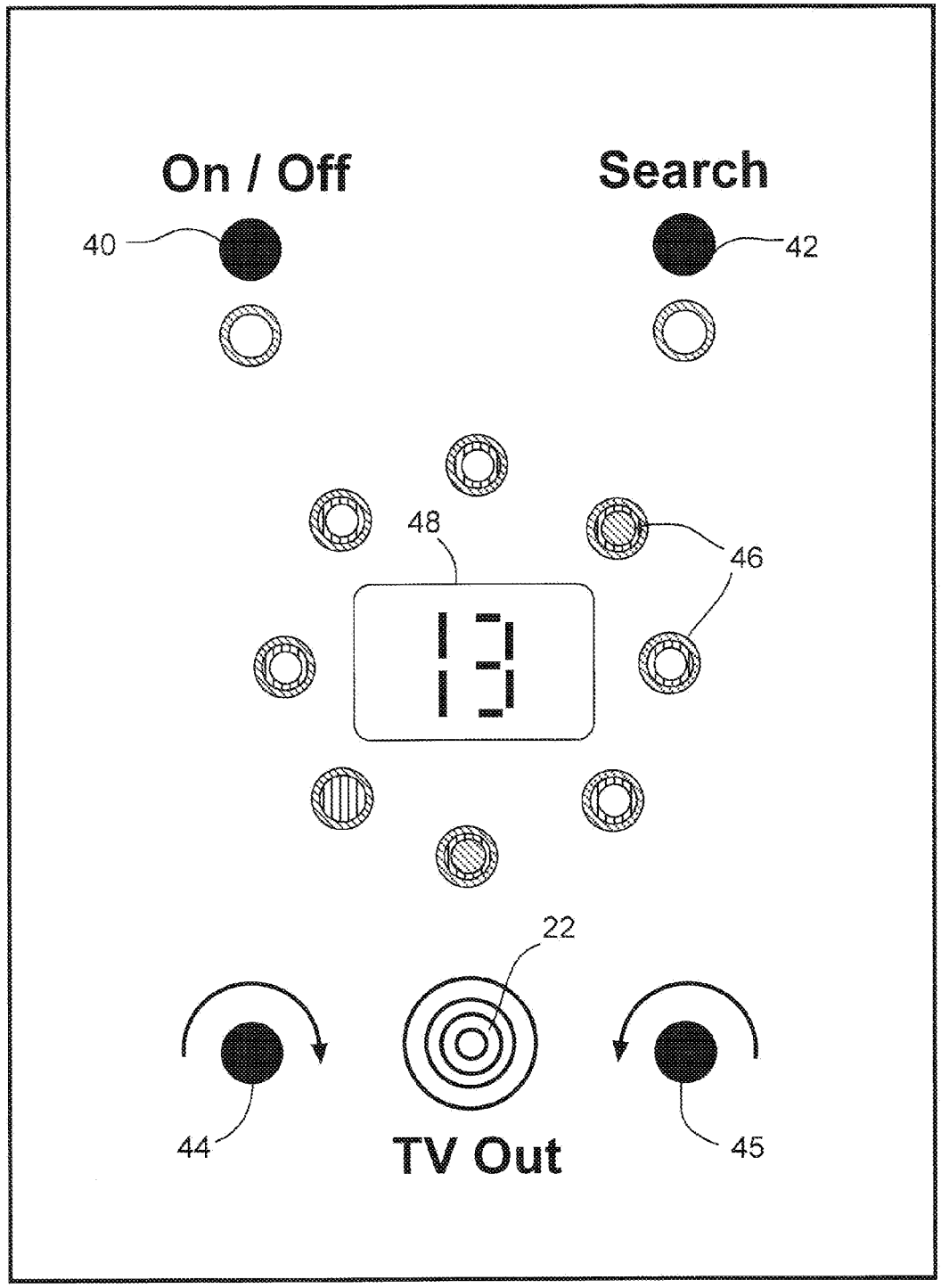
FIG. 4 is a diagram of the front panel of the IDU 20.

FIG. 4 is a diagram of the front panel of the IDU 20 illustrating one embodiment for the user interface 23. A circular pattern of positional LEDs 46 are used both to indicate the angular position of the antenna 10 and the optimal pointing locations found during the search procedure. In particular, green LEDs indicate the antenna's angular position. If two green LEDs are lit, the antenna 10 is positioned between those positions. Red LEDs indicate the optimal pointing locations found during the search. If both the red and green LEDs are lit on the same spot, this indicates the current antenna angular position as well as an optimal pointing direction.

The search button 42 initiates a new search after powering the antenna on. The processor 25 will automatically instruct the ODU 30 to move the antenna 10 to the best result. Pressing the search button 42 after a search has been completed causes the processor 25 to move the antenna 10 between the optimal antenna angular locations found in the last search. Pressing and holding the search button 42 clears memory and starts a new search.

The readout display 48 shows the number of TV frequencies found at the current antenna position. This is the number of radio-frequency (RF) signals available and will usually differ from the number of virtual channels scanned on a TV because of multi-casting. Typically, a TV scan will result in two or three times more channels than RF signals.

The "rotate antenna" buttons 44, 45 (clockwise and counterclockwise) can be used to manually fine tune a channel that may be pixelating or weak. The "rotate antenna" buttons 44, 45 can also be used to manually point the antenna 10 toward a known antenna angular location. An on/off button 40 is used to turn the antenna system on and off.

Figure 5:
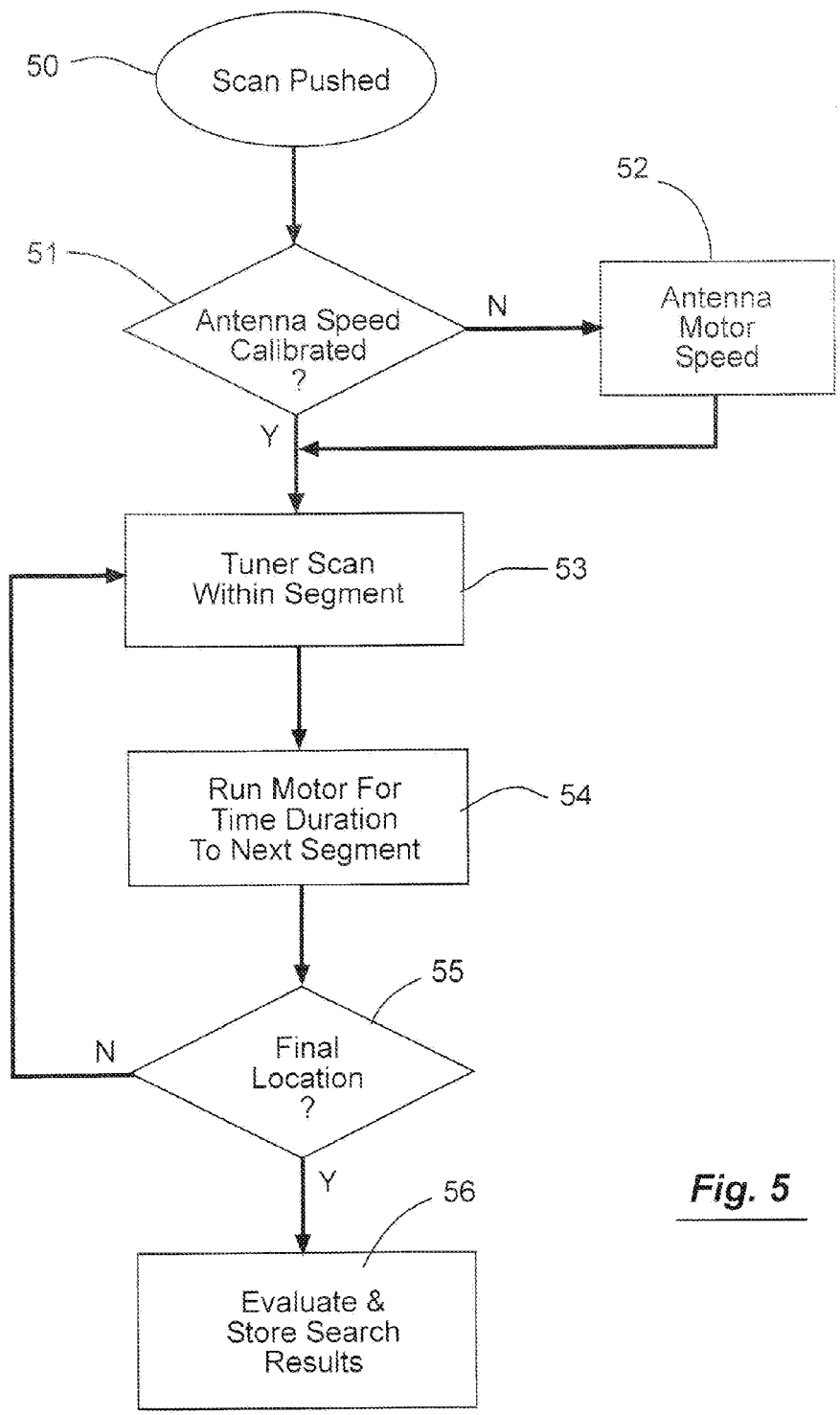
FIG. 5 is a flowchart of the search process used in the initial scan for available television signals.
Figure 6:
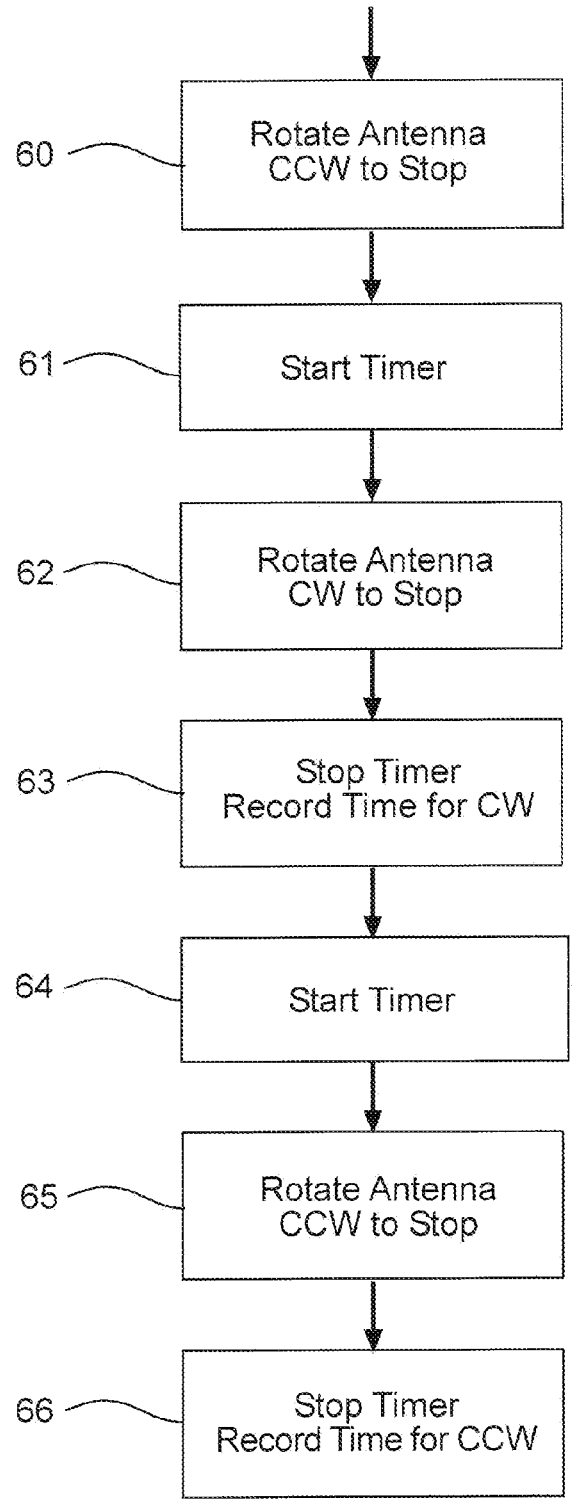
FIG. 6 is a flowchart of the calibration process for determining the angular velocity of the antenna.

FIG. 5 is a flowchart of the signal search process used in the initial scan for available television signals 18, 19. The search process is initiated when the user presses the search button 42 on the IDU 20 (step 50). If the speed of the antenna 12 has not been recently calibrated, the antenna speed calibration process shown in FIG. 6 is executed. Otherwise, the antenna speed stored from the last calibration is used. It should be noted that the antenna speed calibration process in FIG. 6 leaves the antenna in the known stop position, and the start-up procedure for the system also moves the antenna to the stop position, so the antenna can be assumed to be in the stop position when initially entering step 53 in FIG. 5.

In step 53, the processor 25 and tuner 26 scan for television signals within a predetermined arc segment of the antenna's range of rotation. For example, given a LED display 46 in FIG. 4 with eight LEDs, each segment in step 53 of FIG. 5 would be 360°/8, or 45°. This scan can be done in any of several possible ways. For example, the antenna 10 can be rotated through the segment at a constant angular velocity, while the tuner 26 and processor detect TV signals on the fly. The angular position of each TV signal can be calculated based on the elapsed run time for the antenna, given the calibrated antenna speed and the initial angular position of the antenna. Alternatively, the present system can actively seek TV signals within the segment, as outlined for example in U.S. Pat. No. 8,466,965 (Murphy et al.). In this case, the change in location of the antenna at any time can be calculated by multiplying the calibrated antenna speed by the elapsed run time for the antenna. The system then moves to the next segment in step 54 and repeats the search process (step 53) until the final location of the antenna is reached (step 55). The processor then evaluates and stores these search results in data storage (step 56) for subsequent use during normal operation of the antenna system.

FIG. 6 is a flowchart of the calibration process for determining the angular speed of the antenna 10 in step 52 of FIG. 5. In step 60, the antenna 10 is rotated counterclockwise until it hits the stop 16, so that the antenna is in a known starting position for calibration. Next, the processor starts a timer (step 61) and rotates the antenna in the clockwise direction until it hits the stop 16 (step 62). The processor then stops the timer and calculates the elapsed time for the clockwise direction (step 63). Similarly, the processor starts the timer (step 64), rotates the antenna in the counterclockwise direction until it hits the stop 16 (step 65), and then stops the time and calculates the elapsed time for the counterclockwise direction (step 66). The elapsed times in the clockwise and counterclockwise directions can be readily converted in angular speeds for the antenna in these directions.

Figure 7:
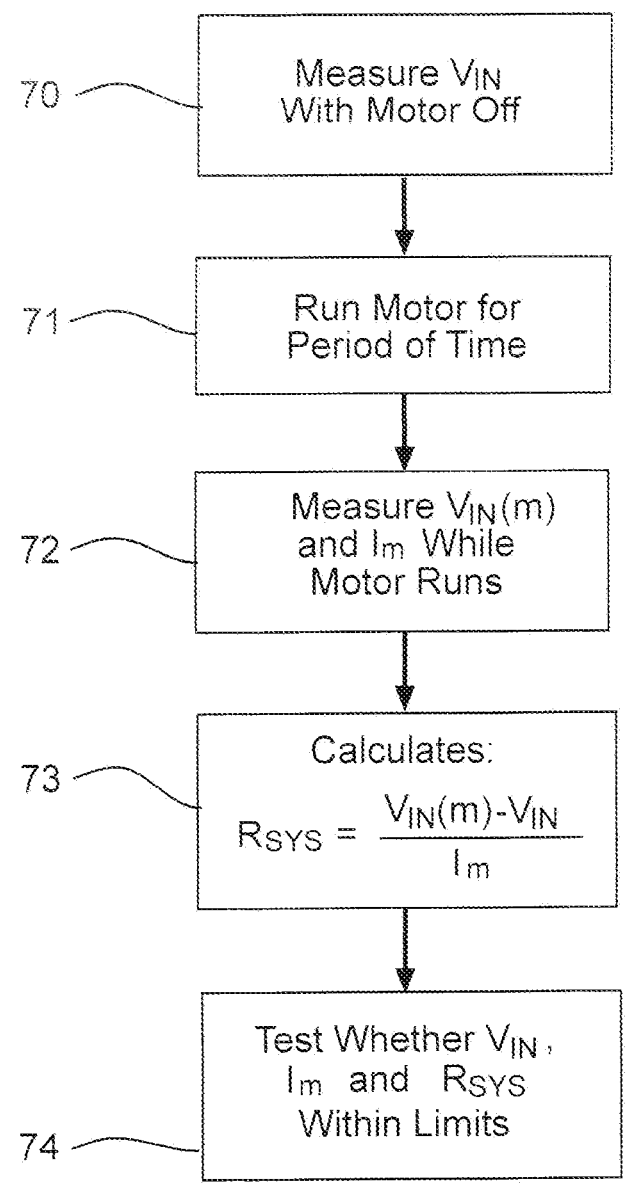
FIG. 7 is a flowchart of the calibration process for determining the motor resistance, which is subsequently used to determine whether the drive motor has stalled.

FIG. 7 is a flowchart of the calibration process for determining the resistance of the motor 12 and cable 38. The motor controller 35 of the ODU 30 controls motor movement by monitoring the voltage supplied to the ODU 30 from the IDU 20. Therefore it is important to be able to measure this voltage accurately. Also, there is a DC voltage drop between the IDU and ODU that varies with current. This drop can be compensated for by adjusting the voltage thresholds that are set by the DC power switching circuitry 27 in the IDU 20 to determine motor movement if the cable resistance is known. In step 70 of FIG. 7, the input voltage $V_{IN}$ supplied to the ODU 30 is initially measured by the ODU. The motor 12 is then run for a period of time in step 71. In step 72, the resulting input voltage $V_{IN}(M)$ and current Inn are measured while the motor 12 runs. In step 73, the cable resistance is calculated by $R_{SYS}=(V_{IN}-V_{IN}(M))/I_M$. This enables the DC voltage windows used to control operation of the motor 12 to be varied depending on the current being drawn by the motor 12. Finally in step 74, the ODU processor 35 tests whether the measured values for $R_{SYS}$, $V_{IN}$, and $I_M$ are within predetermined limits.

Figure 8:
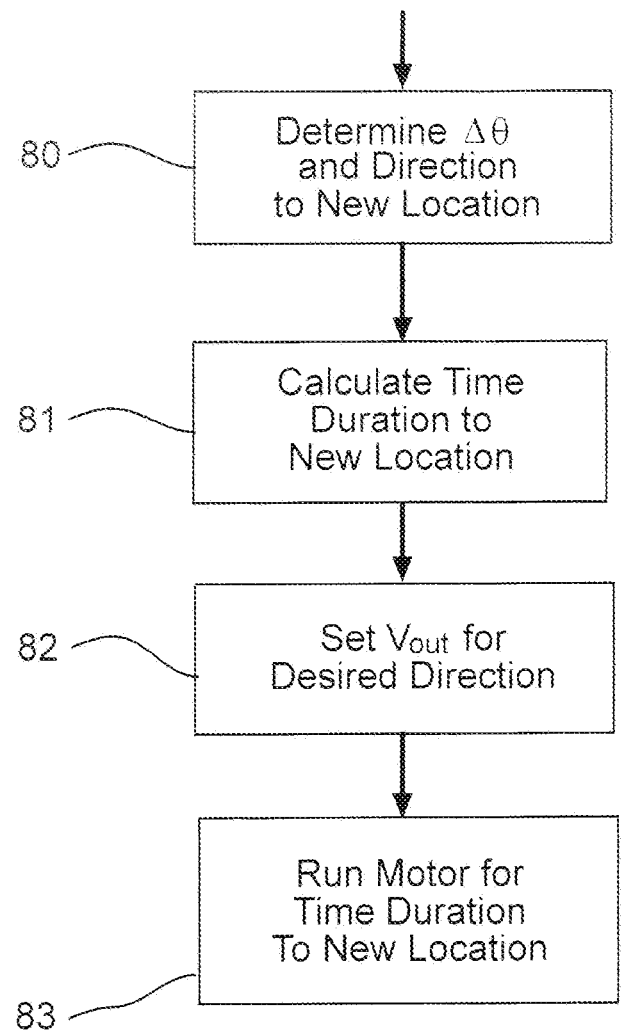
FIG. 8 is a flowchart of the process used to rotate the antenna to a new desired location.

FIG. 8 is a flowchart of the process used to rotate the antenna 10 to a new desired location from a known previous angular position. In response to user input selecting a desired external signal source, the processor 25 retrieves the stored angular direction associated with the desired signal source from data storage. In step 81, the processor 25 calculates the difference in angular position ($\Delta\theta$) between the two locations, and also determines whether the antenna 10 should rotate in a clockwise or counterclockwise direction to reach the new angular position. It should be noted that the antenna 10 cannot rotate through the stop 16, and therefore the stop 16 must be avoided in selecting the direction of travel for the antenna 10.

In step 81, the processor calculates the required travel time duration for the antenna 10 to move to the new angular position based on the direction of travel, and the angular difference ($\Delta\theta$) between the previous angular position and desired angular position divided by the angular velocity of the antenna. The DC power switching circuitry 27 in the IDU 20 is set for the appropriate direction of travel (i.e., clockwise or counterclockwise) in step 82. In step 83, the motor 12 is directed to run for the calculated time duration and direction of travel to move the antenna 10 to the new angular position.

The preceding disclosure has assumed a simple linear relationship in the change in angular position is determined by angular speed multiplied by time. This general concept can be extended to accommodate other factors. For example, the antenna speed can be temperature dependent. To some extent, this will be automatically picked up by the antenna speed calibration process at startup. However, the present system can also be equipped with a temperature sensor, and the processor can include a temperature compensation function in calculating the required travel time duration for moving the antenna. The processor can also programmed to include ramping functions that account for the acceleration and deceleration characteristics of the motor 12 and antenna 10.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. A method for controlling the position of a rotatable antenna in an antenna system having a rotatable antenna, a mechanical stop limiting rotation of the antenna beyond a predetermined point, and a motor rotating the antenna; and a user interface for enabling a user to select a desired angular position for the antenna; said method comprising: conducting an initial scan of the antenna by:
   (a) rotating the antenna over a predetermined range of rotation defined by the mechanical stop limiting further rotation of the antenna beyond a predetermined point, to thereby define an initial present angular position for the antenna;
   (b) measuring the time required to rotate the antenna over the range of rotation; and
   (c) calculating the angular velocity of the antenna during the initial scan based on the measured time to rotate the antenna over the range of rotation; and
   in a subsequent operational mode, in response to user input selecting a desired angular position for the antenna:
   (a) calculating the travel time and direction of travel to rotate the antenna to the desired angular position based on the present angular position and angular velocity of the antenna; and
   (b) controlling the motor to rotate the antenna in the calculated direction of travel for the calculated travel time.

2. The antenna positioning system of claim 1 wherein the initial scan of the antenna further comprises searching for signals received by the antenna and storing data regarding the angular directions of the signals received.

3. The method of claim 1 wherein the step of rotating the antenna over a range of rotation further comprises:
   rotating the antenna in a first direction until the stop is encountered; and
   rotating the antenna in the opposite direction until the stop is encountered while measuring the time required.

4. The method of claim 1 wherein the step of calculating the travel time and direction of travel is further based on avoiding the stop.

5. A method for controlling the position of a rotatable antenna in an antenna system having a rotatable antenna, a mechanical stop limiting rotation of the antenna beyond a predetermined point, and a motor rotating the antenna; and a user interface for enabling a user to select a desired external signal source for the antenna; said method comprising:
  conducting an initial scan of the antenna by:
  (a) rotating the antenna over a predetermined range of rotation defined by the mechanical stop limiting further rotation of the antenna beyond a predetermined point, to thereby define an initial present angular position for the antenna;
  (b) receiving signals via the antenna from external signal sources during the initial scan and storing data regarding the identity and angular directions of the signals received;
  (c) measuring the time required to rotate the antenna over the range of rotation; and
  (d) calculating the angular velocity of the antenna during the initial scan based on the measured time to rotate the antenna over the range of rotation; and
  in a subsequent operational mode, in response to user input selecting a desired external signal source:
  (a) retrieving the stored angular direction associated with the desired external signal source;
  (b) calculating the travel time and direction of travel to rotate the antenna to the angular direction of the desired external signal source, based on the present angular position and angular velocity of the antenna; and
  (c) controlling the motor to rotate the antenna in the calculated direction for the calculated travel time.

6. The method of claim 5 wherein the step of rotating the antenna over a range of rotation further comprises:
  rotating the antenna in a first direction until the stop is encountered; and
  rotating the antenna in the opposite direction until the stop is encountered while measuring the time required.

7. The method of claim 5 wherein the step of calculating the travel time and direction of travel is further based on avoiding the stop.

8. A method for controlling the position of a rotatable antenna in an antenna system having an outdoor unit (ODU) with a rotatable antenna, a mechanical stop limiting rotation of the antenna beyond a predetermined point, and a motor rotating the antenna; and an indoor unit (IDU) with a communications link to the ODU, a receiver, data storage, and a user interface for enabling a user to select a desired external signal source for the antenna; said method comprising: conducting an initial scan of the antenna by:
  (a) rotating the antenna over a predetermined range of rotation defined by the mechanical stop limiting further rotation of the antenna beyond a predetermined point, to thereby define an initial present angular position for the antenna;
  (b) receiving signals via the antenna from external signal sources during the initial scan and storing data regarding the identity and angular directions of the signals received in the data storage of the IDU;
  (c) measuring the time required to rotate the antenna over the range of rotation; and
  (d) calculating the angular velocity of the antenna during the initial scan based on the measured time to rotate the antenna over the range of rotation; and in a subsequent operational mode, in response to user input selecting a desired external signal source:
  (a) retrieving the stored angular direction associated with the desired external signal source from data storage;
  (b) calculating the travel time and direction of travel to rotate the antenna to the angular direction of the desired external signal source, based on the present angular position and angular velocity of the antenna; and
  (c) employing the IDU to control the motor of the ODU to rotate the antenna in the calculated direction for the calculated travel time.

9. The method of claim 8 wherein the step of rotating the antenna over a range of rotation further comprises:
  rotating the antenna in a first direction until the stop is encountered; and
  rotating the antenna in the opposite direction until the stop is encountered while measuring the time required.

10. The method of claim 8 wherein the step of calculating the travel time and direction of travel is further based on avoiding the stop.

* * * * *